United States Patent [19]

Yamagata

[11] Patent Number: 5,414,572
[45] Date of Patent: May 9, 1995

[54] HAVING HEAD SHIFT CONTROL MEANS WITH SELECTABLE HEAD SHIFT RATES AND HEAD CONTROL POSSIBILITIES

[75] Inventor: Shigeo Yamagata, Kanagawa, Japan

[73] Assignee: Canon Kabushiki Kaisha, Tokyo, Japan

[21] Appl. No.: 101,649

[22] Filed: Aug. 4, 1993

Related U.S. Application Data

[60] Division of Ser. No. 912,012, Jul. 10, 1992, Pat. No. 5,267,102, which is a continuation of Ser. No. 449,508, Dec. 4, 1989, abandoned, which is a continuation of Ser. No. 313,351, Feb. 21, 1989, abandoned, which is a continuation of Ser. No. 81,596, Aug. 3, 1987, abandoned, which is a continuation of Ser. No. 849,342, Apr. 7, 1986, abandoned, which is a continuation of Ser. No. 698,624, Feb. 6, 1985, abandoned.

[30] Foreign Application Priority Data

Feb. 6, 1984 [JP] Japan .................. 59-18411
Jul. 24, 1984 [JP] Japan .................. 59-154695

[51] Int. Cl.[6] .................................... G11B 5/55
[52] U.S. Cl. .................... 360/75; 358/335; 358/909.1
[58] Field of Search ............... 360/69, 75; 358/335, 358/906, 909.1; 348/207, 220, 222, 231, 232

[56] References Cited

U.S. PATENT DOCUMENTS 4,366,501 12/1982 Tsunekawa et al. ........... 358/906 X
4,456,931 6/1984 Toyoda et al. ............... 358/335
5,258,878 11/1993 Araki et al. ................. 360/75 X
5,267,102 11/1993 Yamagata .................... 360/75

Primary Examiner—Aristotelis M. Psitos
Assistant Examiner—James L. Habermehl
Attorney, Agent, or Firm—Anderson Kill Olick & Oshinsky

[57] ABSTRACT

In a recording and/or reproducing apparatus having a recording and/or reproducing head which is movable relative to a record bearing medium and is arranged to record and/or reproduce signals at various positions on the record bearing medium, there are provided display means for displaying information; selecting means for selecting from among a plurality of different head shifting speeds or modes a desired mode in shifting the head relative to the record bearing medium; and control means for causing the display means to display the selected head shifting mode in case that the selecting means selects the head shifting mode and to display other information in other cases.

26 Claims, 8 Drawing Sheets

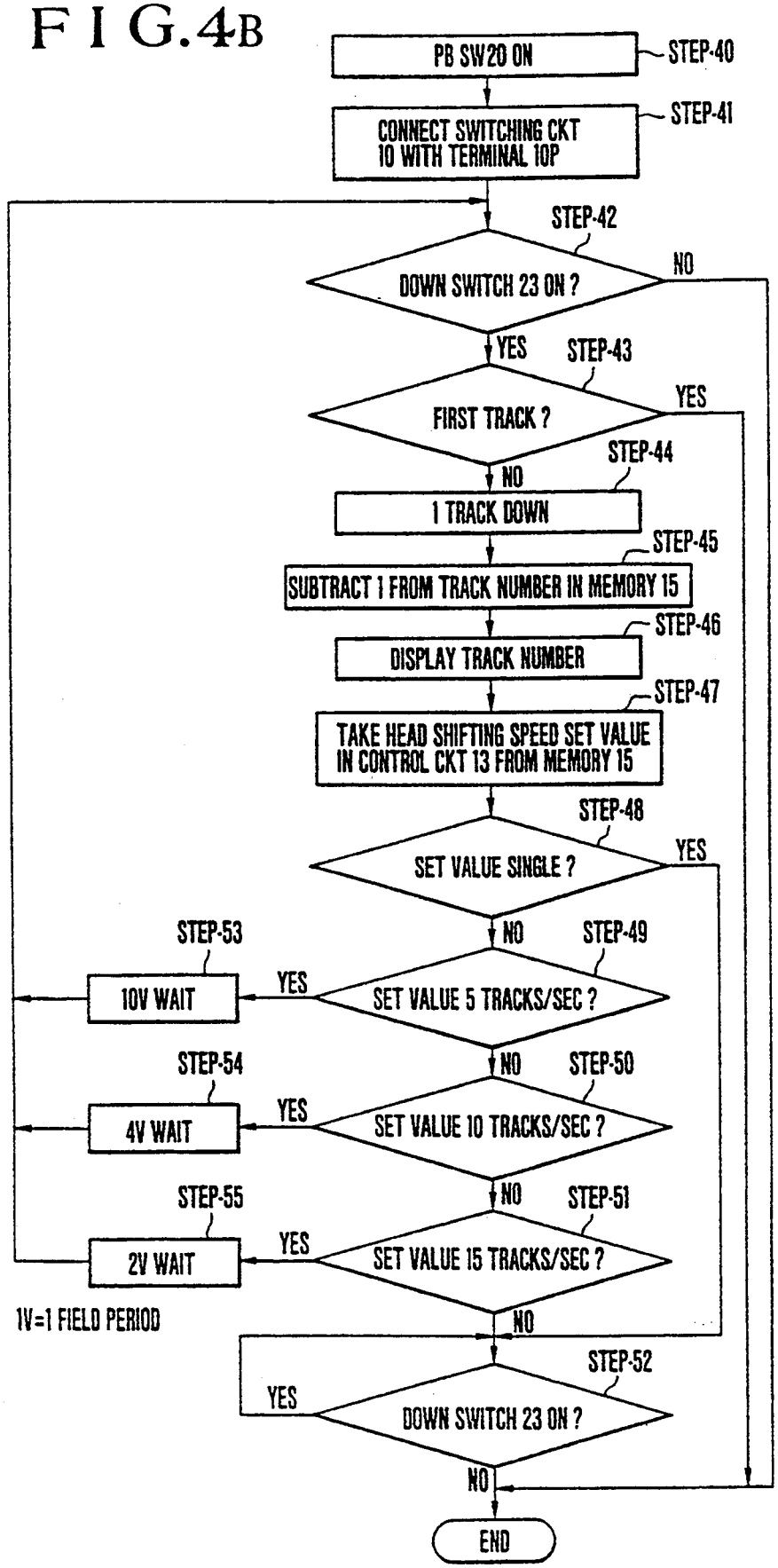

HAVING HEAD SHIFT CONTROL MEANS WITH SELECTABLE HEAD SHIFT RATES AND HEAD CONTROL POSSIBILITIES

This is a divisional application of Ser. No. 07/912,012, filed Jul. 10, 1992, now U.S. Pat. No. 5,267,102 which is a continuation application of Ser. No. 07/449,508, filed Dec. 4, 1989, now abandoned; which in turn is a continuation application of Ser. No. 07/313,351, filed Feb. 21, 1989, now abandoned; which in turn is a continuation application of Ser. No. 07/081,596, filed Aug. 3, 1987, now abandoned; which in turn is a continuation application of Ser. No. 06/849,342, filed Apr. 7, 1986, now abandoned; and which in turn is a continuation of Ser. No. 06/698,624, filed Feb. 6, 1985, now abandoned.

BACKGROUND OF THE INVENTION

1. Field of the Invention

This invention relates to a recording and/or reproducing apparatus and more particularly to an apparatus having a recording and/or reproducing head which is movable relative to a record bearing medium and is arranged to record and/or reproduce signals at various positions on the record bearing medium.

2. Description of the Prior Art

The recording and/or reproducing apparatuses of the above-stated type include still picture recording and/or reproducing apparatuses of the kind using, for example, a magnetic disc or a magnetic drum or the like as the record bearing medium and having a movable magnetic head arranged to record one field or one frame portion of a video signal on the medium while forming recording tracks at various positions on the medium and/or to reproduce the signal thus recorded.

In the apparatus of this kind, arrangement to provide various head shifting speeds or modes relative to the record bearing medium and to permit selection of a desired speed or mode from among these modes gives a great advantage for broadening the range of the functions of the apparatus.

It is also advantageous to permit setting the recording and/or reproducing head at desired position on the record bearing medium.

With the apparatus of this kind provided with the above-stated two facilities, the apparatus is preferably arranged to be capable of displaying a selected head shifting speed or mode and also a set recording or reproducing position.

In that instance, however, arrangement to have a display device for each of the two facilities separately from the other causes a cost increase and is not desirable. On the other hand, arrangement to have such specialized displays on one display device not only causes an increase in size of the display device but also tends to make displayed information confusing and misleading.

SUMMARY OF THE INVENTION

The present invention is directed to the solution of the above-stated problem of the conventional recording and/or reproducing apparatus of the kind mentioned. It is thus an object of this invention to provide a recording and/or reproducing apparatus of the kind permitting selection of a head shifting speed or mode from among a plurality of different head shifting speeds or modes, wherein a display arrangement for displaying the selected head shifting mode is simplified and made compact for reduction in cost of the apparatus; and yet the fear of a confusing information display is lessened.

Under this object, a recording and/or reproducing apparatus which embodies an aspect of this invention and has a recording and/or reproducing head arranged to be shiftable relative to a record bearing medium for recording or reproducing signals at various positions on the medium comprises: Display means for displaying information; selection means for selecting a mode of shifting the head relative to the record bearing medium from among a plurality of different head shifting modes; and control means for causing the display means to display the selected head shifting mode in case that the selection means selects the head shifting mode and to display other information in other cases.

It is another object of this invention to provide a recording and/or reproducing apparatus which, besides attaining the above-stated object, is capable of permitting simplification of arrangement and an operation required for selecting a head shifting mode.

Under this object, recording and/or reproducing apparatuses embodying other aspects of this invention are arranged to select the head shifting mode in the following manners: (1) In case where a selection switch is under a continuous selecting operation, the above-stated plurality of head shifting modes are switched successively from one mode to another in a predetermined cycle and a mode obtained at the end of the continuous operation on the selection switch is eventually selected for head shifting; (2) a mode setting switch is arranged in combination with up- and down-shift switches. The up- and down-shift switches are arranged besides for other purposes to be usable for shifting the head relative to a record bearing medium. One of the plurality of head shifting modes can be selected by suitably operating the up-or down-shift switch under an operation on the mode setting switch; and (3) in case that a selection switch is repeatedly operated, the head shifting mode can be shifted from one mode to another only when the repeating time interval is shorter than a predetermined length of time.

The above and further objects and features of this invention will become apparent from the following detailed description of preferred embodiments thereof taken in connection with the accompanying drawings.

BRIEF DESCRIPTION OF THE DRAWINGS

Preferred embodiments of this invention are arranged as shown in the accompanying drawings, in which:

FIGS. 4A and 4B are flow charts showing signal reproducing operations of the embodiment, FIG. 4A showing an operation performed in a direction in which the numbers assigned to recording tracks increase and FIG. 4B showing another operation performed in another direction in which the recording track numbers decrease.

DETAILED DESCRIPTION OF THE PREFERRED EMBODIMENTS

Figure 1:
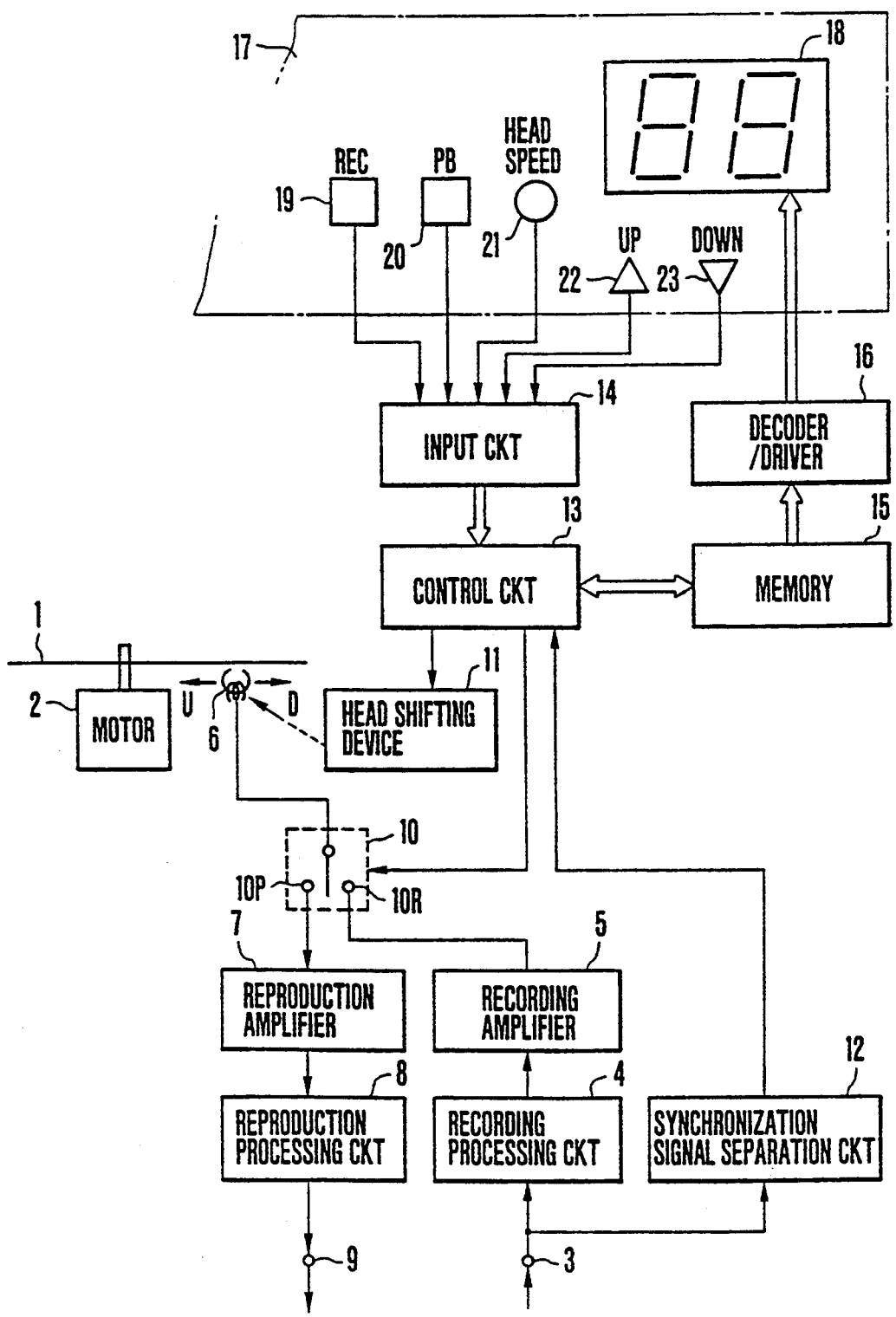
FIG. 1 is a block diagram showing the arrangement of an embodiment of this invention.

FIG. 1 shows an example in which this invention is applied to a still picture recording and reproducing apparatus of the kind using a magnetic disc as a record bearing medium. The illustration includes the magnetic disc 1 which is used as the record bearing medium; a motor 2 which is controlled to rotate at a speed corresponding to the field frequency of a TV(television) signal by known control means (.not shown); a recording processing circuit 4 which is arranged to perform a processing operation for recording such as modulation, etc. on a video signal coming via a video signal input terminal 3; a recording amplifier 5 which is arranged to amplify a signal produced from the processing circuit 4; a magnetic head 6 for recording and reproduction; a reproduction amplifier 7 which is arranged to amplify a signal picked-up by the magnetic head 6; a reproduction processing circuit 8 which is arranged to perform a processing operation for reproduction such as demodulation, etc. on the output of the reproduction amplifier 7; an output terminal 9 for producing a reproduction video signal; a switching circuit 10 which is arranged to selectively connect the winding of the head 6 to the output terminal of the recording amplifier 5 or to the input terminal of the reproduction amplifier 7; a head shifting device 11 which is arranged to shift the head 6 in the radial direction of the disc 1; and a synchronization signal separation circuit 12 which is arranged to separate a vertical synchronization signal from the video signal supplied to the input terminal 3.

An input circuit 14 is arranged to supply a control circuit 13 with signals coming from various operation switches which will be described later herein. A memory 15 is arranged to store data which are received from the control circuit 13 with regard to a head shifting speed or mode and on the position of the head 6 on the disc 1, i.e. a track number. A decoder/driver 16 is arranged to convert the output data of the memory 15 into a display data and to drive a display device which will be described later according to the converted data.

The apparatus is provided with a front panel 17. A 7-segment LED display device 18 of two figures is arranged on the front panel 17. The decoder/driver 16 drives the display device 18 to selectively desplay a number assigned to a recording track to which the magnetic head 6 is opposed on the magnetic disc 1 or a speed at which the head 6 is to be shifted. On the front panel 17 are further arranged various switches, including: A recording switch 19. A signal from the recording switch 19 is supplied via the input circuit 14 to the control circuit 13. When the switch 19 is turned on, the control circuit 13 connects the switching circuit 10 to a terminal 10R thereof, for example, for a period of one field which is synchronized with the vertical synchronization signal coming from the synchronization signal separation circuit 12. As a result of this, one field portion of the video signal is recorded on one track to which the magnetic head 6 is opposed on the disc 1 at that time. A reproduction switch 20 is also disposed on the front panel 17. A signal from this switch 20 is also supplied via the input circuit 14 to the control circuit 13.

When the switch 20 is turned on, the control circuit 13 connects the switching circuit 10 to another terminal 10P thereof. Then, a signal recorded on a recording track to which the head 6 is opposed at that time is reproduced. A head shifting speed selection switch 21 is selection means for selecting a head shifting speed or mode from among a plurality of different head shifting speeds or modes. A signal produced from the selection switch 21 is also supplied via the input circuit 14 to the control circuit 13. In case that the switch 21 is off, the control circuit 13 sets the apparatus in a recording mode or reproduction mode in response to an operation on the recording switch 19 or the reproduction switch 20. If the switch 21 is turned on, the operation mode of the apparatus is shifted by the control circuit 13 to a head shifting speed selecting mode. An up-shift switch 22 and a down-shift switch 23 are arranged also on the front panel 17 to shift the head 6 on the disc 1 in the direction of increasing the track number or decreasing the track number as indicated by an arrow U or D in the drawing. Signals produced from these switches 22 and 23 are also arranged to be supplied via the input circuit 14 to the control circuit 13.

In the arrangement of this embodiment, the memory 15, the decoder/driver 16 and the display device 18 jointly form display means which operate to display a selected head shifting speed in the head shifting speed selecting mode and to display the position of the head 6 on the disc 1, that is, a track number representing a recording position or a reproducing position of the head 6 in a mode other than the head shifting speed selecting mode.

Among the above-stated switches 19–23, the reproduction switch 20 is alone of the self holding type and is arranged to turn on in response to a first operation thereon and to turn off in response to a second operation. On the other hand, all other switches 19, 21, 22 and 23 are arranged to remain on as long as they are under continuously depressing operations respectively.

Figure 2:
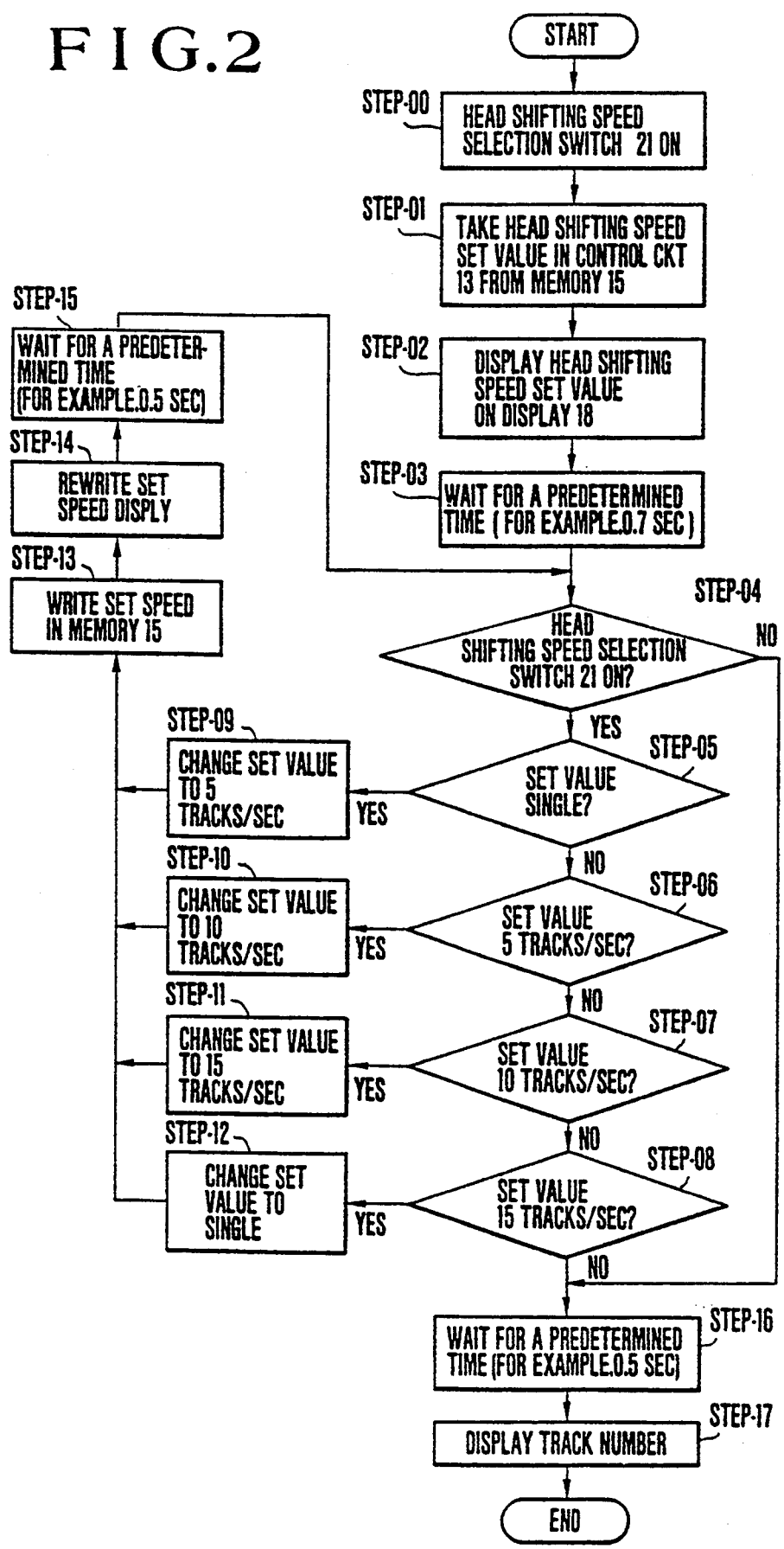
FIG. 2 is a flow chart showing the steps of a head shifting speed setting operation.
Figure 3:
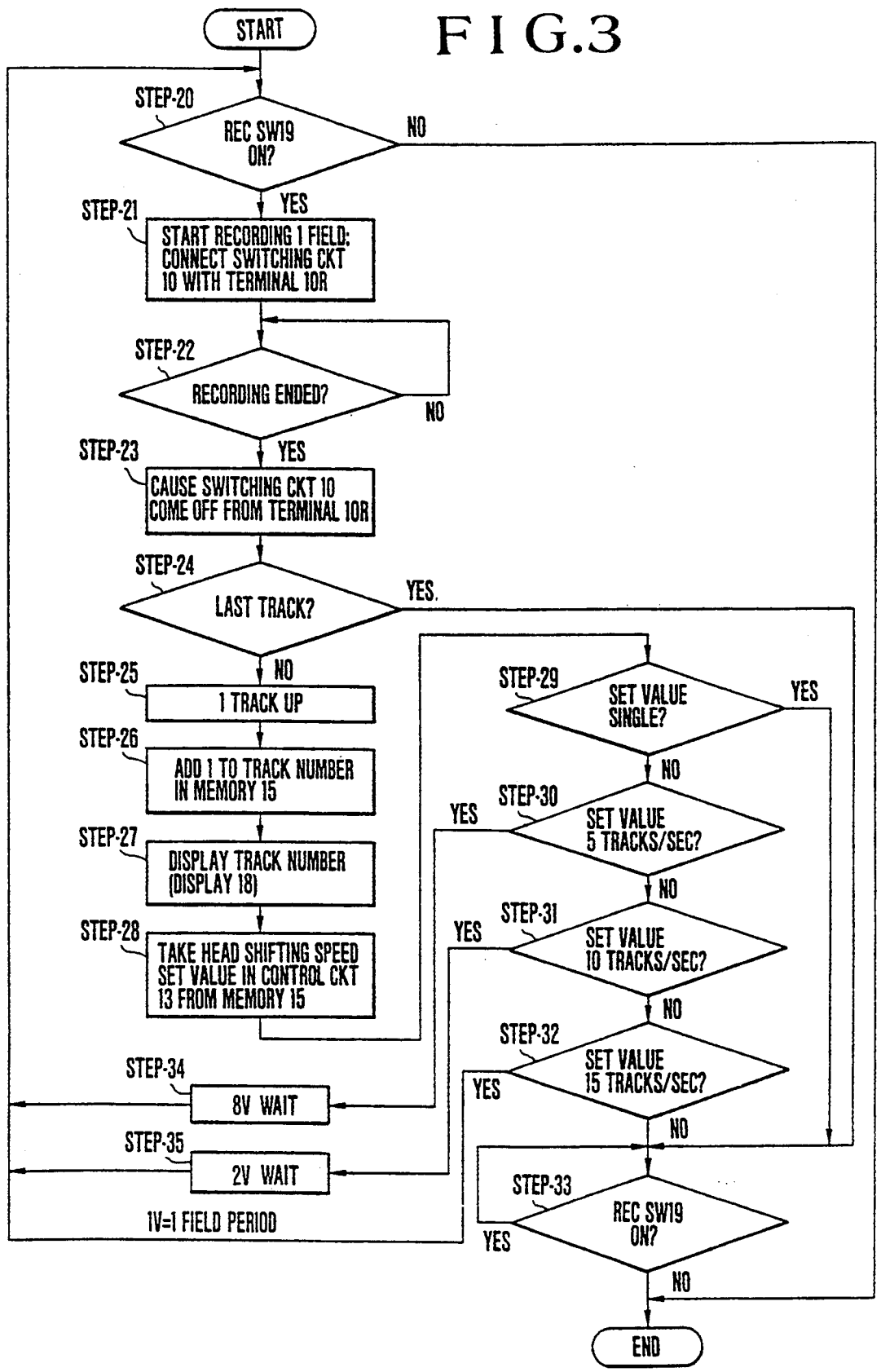
FIG. 3 is a flow chart showing a signal recording operation of the embodiment.

Referring to FIGS. 2, 3 and 4, the operation of the embodiment is as follows: First, the head shifting speed setting operation is described with reference to the flow chart of FIG. 2. The magnetic head 6 is arranged to be shiftable in two different manners. One is a single mode (or a single step head shifting mode) and the other a continuous mode. A control operation on the shift of the magnetic head 6 varies with the shifting mode.

The single mode is arranged as follows: One field portion of the video signal is recorded every time the recording switch 19 is turned on in the recording mode. Then, the head 6 is shifted to a next recording position upon completion of every recording process. In the reproduction mode, the magnetic head 6 is shifted to an extent corresponding to one track pitch in the direction of arrow U or D (see FIG. 1) according to the operation or the up-shift switch 22 or the down-shift switch 23 every time the switch 22 or 23 is operated.

The continuous mode is arranged as follows: In the recording mode, one-field portions of the video signal are respectively recorded on different portions of the disc 1 one after another as long as the recording switch 19 is kept on. The magnetic head 6 is shifted from one recording position to another upon completion of recording of every one-field portion. In the reproduction mode, the head 6 is shifted at a predetermined speed in the direction designated by the up-shift switch 22 or the down-shift switch 23 as long as the switch 22 or 23 is kept on, so that the record of each of the recording tracks is reproduced for a predetermined period of time one after another.

In this specific embodiment, the continuous mode includes three sub-modes having different head shifting speeds which are, for example, 5 tracks/sec, 10 tracks/sec and 15 tracks/sec. With the embodiment arranged in the above-stated manner, the speed selecting operation in the head shifting speed selecting mode will be described below with reference to the flow chart of FIG. 2:

When the head shifting speed selection switch 21 is turned on (Step-00), the control circuit 13 takes in a data on the head shifting speed from the memory 15 stored at that time in the memory 15 (Step-01) and at the same time causes the data to be supplied also to the decoder/driver 16. Accordingly, the display device 18 displays the head shifting speed (Step-02). The display which is made at that time is a head shifting speed set before the head shifting speed selection switch 21 is turned on. The control circuit 13 allows the speed display to be made for a given period of time, say, about 0.7 sec (Step-03). When the head shifting speed selection switch 21 remains on for a period longer than the above-stated given period of time (Step-04), the control circuit 13 causes the memory 15 to repeatedly produce "00", "05", "10" and "15" one after another in this order in a given cycle, e.g. about 0.5 sec (Step-15), (Step-04–Step-13). Therefore, the display device 18 repeatedly displays "00", "05", "10" and "15" in the above-stated cycle and order (Step-14 and Step-15). These display values "00", "05", "10" and "15" respectively represent a single step mode, a 5 tracks/sec continuous mode, a 10 tracks/sec continuous mode and a 15 tracks/sec continuous mode.

The above-stated arrangement of the seven-segment LED display device 18 may be preferably replaced with another display device (such as a liquid crystal display device, a fluorescent display device, etc.) that is capable of displaying such letters as "SI", "LO", "MI", "HI" or the like to ensure clear discrimination between the track numbers and the head shifting speed values. Such arrangement effectively prevents any misleading display. The above-stated letter displays "SI", "LO", "MI" and "HI" are respectively intended to indicate the single step mode, a low speed continuous mode, a medium speed continuous mode and a high speed continuous mode. They correspond to the above-stated displays "00", "05", "10" and "15".

When a desired head shifting speed, for example, "00" (Step-05) is displayed, the head shifting speed selection switch 21 is turned off (Step-04). With the switch 21 turned off, the head shifting speed setting no longer changes and the speed "00" is further displayed, for example, for about 0.5 sec (Step-16). After the lapse of this predetermined period of time, the display is replaced with a display of a number assigned to a track which is confronting the head 6 at that time (Step-17). The head shifting speed is set in this manner.

Referring now to the flow charts of FIGS. 3, 4A and 4B, the signal recording and reproducing operations of the embodiment are as follows:

In case that the head shifting mode is set in the single step mode, the signal is recorded as follows: As shown in FIG. 3, when the recording switch 19 is turned on (Step-20), the control circuit 13 causes the switching circuit 10 to connect with the terminal 10R thereof for a one-filed period in synchronism with the vertical synchronization signal coming from the synchronization signal separation circuit 12 (Step-21). Then, one field portion of a video signal is recorded via the head 6 on the disc 1. Upon completion of the recording process (Step-22), the control circuit 13 causes the switching circuit 10 to come off from the terminal 10R (Step-23). Following that, the control circuit 13 causes the head shifting device 11 to begin to operate. The head 6 is shifted in the direction of increasing the track number, i.e. in the direction of arrow U as indicated in FIG. 1, to an extent corresponding to one track pitch (Step-24 and Step-25). Then, within the memory 15, "1" is added to the track number data (Step-26). As a result of this, the track number displayed at the display device 18 increases by one (Step-27). The control circuit 13 takes in from the memory 15 a data on the head shifting speed (Step-28). In case of the single mode (Step-29), the control circuit 13 does not cause another recording process to take place even if the recording switch 19 remains on (Step-33).

Figure 4A:
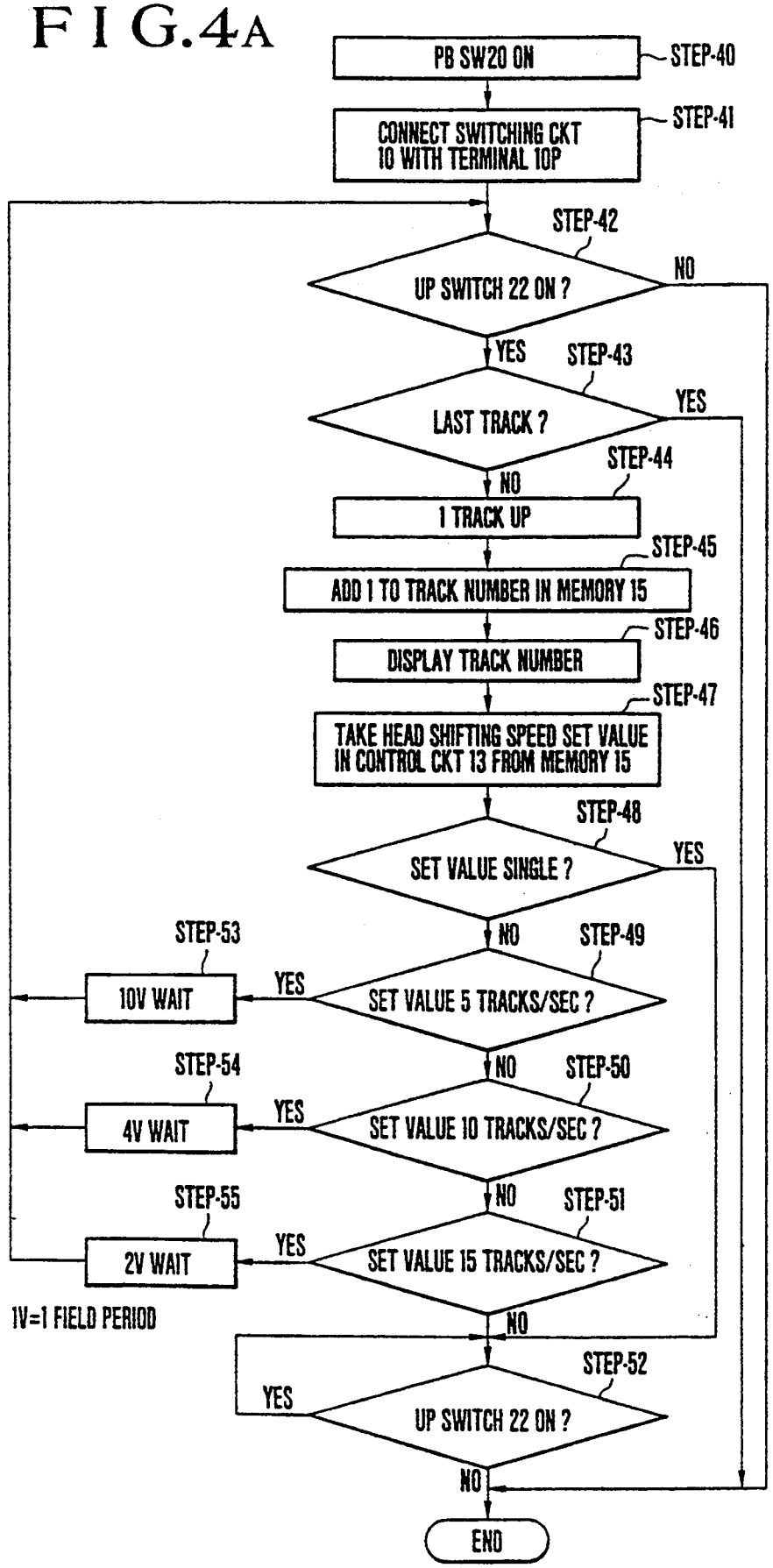

In case of signal reproduction, as shown in the flow charts of FIGS. 4A and 4B, the control circuit 13, in response to an operation on the reproduction switch 20 (Step-40), causes the switching circuit 10 to connect with the terminal 10P thereof (Step-41). As a result of this, a signal picked up by the head 6 is processed by the reproduction amplifier 7 and the reproduction processing circuit 8 and the signal thus processed for reproduction is produced from the output terminal 9. In this signal reproducing mode, the control circuit 13 causes the head shifting device 11, every time the up-shift switch 22 or the down-shift switch 23 is turned on (Step-42), to shift the head 6 to an extent corresponding to one track pitch in the direction of arrow U or D as designated by the switch 22 or 23 (Step-43 and Step-44). In case of increasing by one track, "1" is added to the track number stored within the memory 15. In case of decreasing by one track, "1" is subtracted from the track number (Step-45). Accordingly, the display device 18 displays a new track number which has been either increased or decreased by one (Step-46). Meanwhile, the control circuit 13 takes in the setting value of head shifting speed from the memory 15 (Step-47).

Next, in case that the head shifting mode is in the continuous mode, the embodiment operates in the following manner: Again referring to the flow chart of FIG. 3, when the recording switch 19 is turned on for signal recording, the control circuit 13 controls the switching circuit 10 on the basis of the vertical synchronization signal from the synchronization signal separation circuit 12 in the same manner as described in the foregoing. One field portion of the signal is thus recorded via the magnetic head 6. Then, immediately after completion of the recording process, the magnetic head 6 is shifted to an extent corresponding to one track pitch in the direction of increasing the track number, or in the direction of arrow U as shown in FIG. 1, at a head shifting speed set at that time (Step-30–Step-35). Following this, the control circuit 13 again causes another field portion of the signal recorded according to the vertical synchronization signal in the shifted position. This operation continues as long as the recording switch 19 remains on and comes to an end when the switch 19 is turned off. However, in case that the recording switch 19 is turned off during the recording process, the operation comes to an end after completion of recording of the unfinished one field portion of the signal and with the head 6 having been shifted to a next recording position.

The signal reproducing operation of the embodiment in the continuous head shifting mode is basically the same as the reproducing operation in the single step head shifting mode. In this case, as shown in FIGS. 4A and 4B, the control circuit 13 causes the magnetic head 6 to be shifted as long as the up-shift switch 22 or the down-shift switch 23 remains on, at the head shifting speed set at that time, in the direction of arrow U or D (FIG. 1) according as designated by the switch 22 or 23.

Figure 5A:
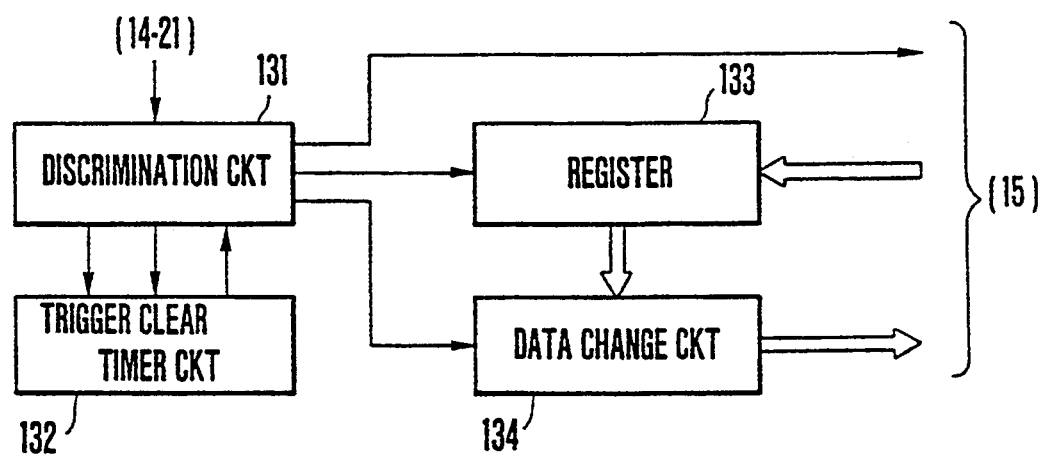
FIGS. 5A and 5B are block diagrams showing the arrangement of function blocks to be included in a control circuit shown in FIG. 1.
Figure 5B:
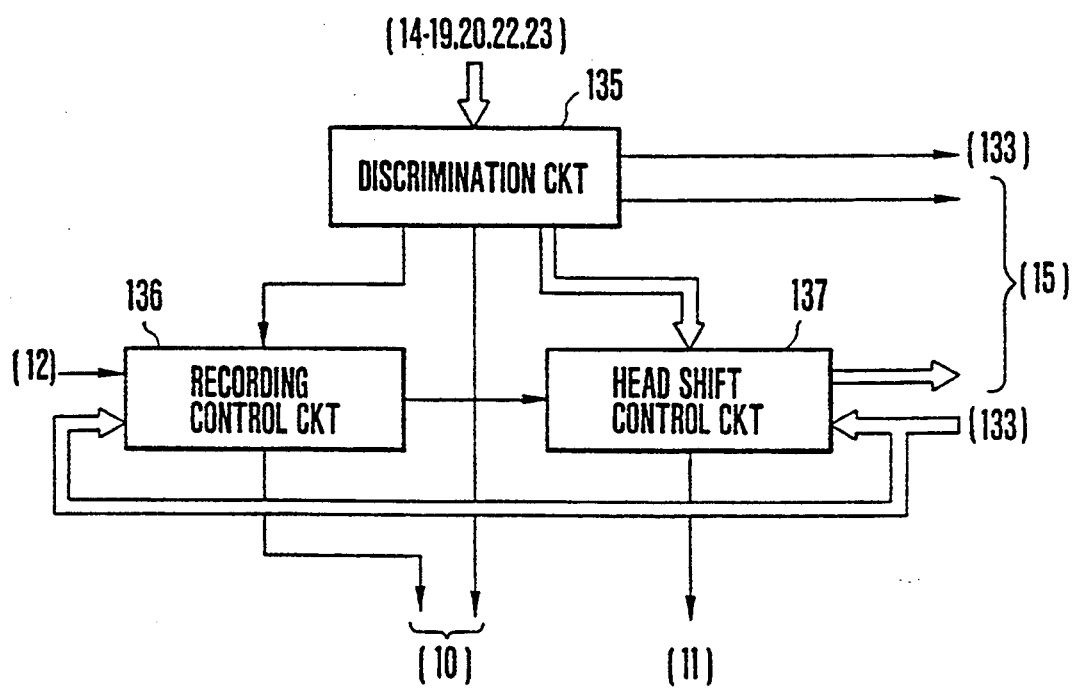

The control circuit 13 may be composed of a microcomputer or a CPU. The function block arrangement required for the above described embodiment is as shown in FIGS. 5A and 5B. Referring first to FIG. 5A which shows the function block arrangement required for setting a head shifting speed mentioned in the foregoing. The arrangement includes a discrimination circuit 131 which is arranged to perform a discriminating operation on the basis of a data from the input circuit 14 representing particularly the on or off of the switch 21 and also the output of a timer circuit 132 which is arranged to count the above-stated predetermined period of time; a register 133 which is arranged to receive a preset data on the head shifting speed from the memory 15 and to store the data therein; and a data change circuit 134 which is arranged to supply the memory 15 with a data on a renewed head shifting speed when the head shifting speed is changed.

In this arrangement, with the switch 21 turned on (at the Step-00 shown in FIG. 2), the discrimination circuit 131 instructs the memory 15 to produce a data on the preset head shifting speed and causes the register 133 to store the output data of the memory 15 (Step-01 of FIG. 2). The display device 18 then displays the preset head shifting speed (Step-02 of FIG. 2). At the same time, the discrimination circuit 131 triggers the timer circuit 132 to cause it to begin a time counting process (Step-03 of FIG. 2). In case that the switch 21 is turned off before a predetermined period of time (0.7 sec) is counted up by the timer circuit 132 (Step-04 of FIG. 2), the discrimination circuit 131 clears the timer circuit 132 and again triggers the timer circuit 132 to have a time count newly started (Step-16 of FIG. 2). Upon completion of the time count for another predetermined period of time (0.5 sec) by the timer circuit 132, the dicrimination circuit 131 clears the timer circuit 132 and instructs the memory 15 to produce a data on the track number. This causes the display device 18 to display the track number (Step-17 of FIG. 2).

In case that the switch 21 remains on even after the lapse of the above-stated predetermined period of time (0.7 sec) (Step-04 of FIG. 2), the discrimination circuit 131 clears the timer circuit 132 concurrently with the lapse of the predetermined period of time (0.7 sec) and again triggers the timer circuit 132 to begin another time count process. The discrimination circuit 131 also instructs the data change circuit 134 to make a change to a next head shifting speed. As a result of that, the head shifting speed is shifted to the next setting value or speed (Step-05–Step-12 of FIG. 2). Further, the discrimination circuit 131 instructs the memory 15 to take in and produce the output of the data change circuit 134 (Step-13 of FIG. 2). This causes the display device 18 to display the renewed value of the head shifting speed (Step-14 of FIG. 2). In case that, the clearing and retriggering of the timer circuit 132 are repeatedly performed every time the timer circuit 132 finishes counting the predetermined period of time (0.5 sec). By this, the setting value of the head shifting speed is renewed by the data change circuit 134 in the cycle of the predetermined period of time (0.5 sec) in a repeating manner (Step-15 of FIG. 2).

Next, referring to FIG. 5B which shows the arrangement of the function blocks required for recording and reproduction, the control circuit 13 includes a discrimination circuit 135 which is arranged to discriminate data on the on and off of the operation switches 19, 20, 22 and 23 through the input circuit 14; a recording control circuit 136 which is arranged to control a recording operation on the basis of the output of the discrimination circuit 135, a data on the head shifting speed coming from the register 133 and the vertical synchronization signal from the synchronization signal separation circuit 12; and a head shift control circuit 137 which is arranged to control the head shifting device 11 on the basis of the output of the discrimination circuit 135 or that of the recording control circuit 136 and the head shifting speed data from the register 133.

In case of recording, upon receipt of a data indicating that the switch 19 is turned on from the input circuit 14, the discrimination circuit 135 instructs the recording control circuit 136 to operate. The recording control circuit 136 then controls the switching circuit 10 to have one field portion of a video signal recorded according to the vertical synchronization signal from the synchronization signal separation circuit 12. Upon completion of recording of one field portion of the signal, the recording control circuit 136 instructs the head shift control circuit 137 to shift the head 6. In response to this instruction, the head shift control circuit 137 causes the head 6 to be shifted and, at the same time, supplies the memory 15 with a data on the corresponding track number. Then, the discrimination circuit 135 instructs the memory 15 to store the track number data and to supply it to the decoder/driver 16. The decoder/driver 16 then causes the display device 18 to display this track number. The discrimination circuit 135 also causes the head shifting speed data from the memory 15 to be stored at the register 133 of FIG. 5A. After that, the recording control circuit 136 controls the above-stated recording operation and the shifting action of the head shift control circuit 137 on the basis of the head shifting speed data stored at the register 133.

In reproduction, the discrimination circuit 135, upon detection of that the switch 20 is turned on, causes the switching circuit 10 to connect with the reproduction side (10P) thereof. When the switch 22 or 23 is turned on under this condition, the discrimination circuit 135 instructs the head shift control circuit 137 to have the head 6 shifted in the direction designated by the switch 22 or 23. In response to this instruction, the head shift control circuit 137 controls and causes the head shifting device 11 to shift the head 6 and, at the same time, produces a corresponding track number data to the memory 15. Then, the discrimination circuit 135 instructs the memory 15 to store the track number data and supply it to the decoder/driver 16. The decoder/driver 16 then drives the display device 18 to display the track number. In addition to that, the discrimination circuit 135 then causes the head shifting speed data of the memory 15 to be stored at the register 133. The head shift control circuit 137 then controls the shift of the head 6 on the basis of the head shifting speed data stored at the register 133 and the data received from the discrimination circuit 135 concerning the head shifting direction designated by the switch 22 or 23.

While this specific embodiment of the invention is arranged as described in the foregoing, the control circuit 13 may be modified in the following manner: With the head shifting speed selection switch 21 turned on, it merely sets the apparatus in the head shifting speed selecting mode and does not cause actual selection of any head shifting speed until either the up-shift switch 22 of down-shift switch 23 is turned on with the switch 21 still kept on. In the case of this modification, the speed setting is preferably arranged to shift in the order of "00", "05", "10" and "15" with the up-shift switch 22 turned on and in the reverse order with the down-shift switch 23 turned on.

Figure 6:
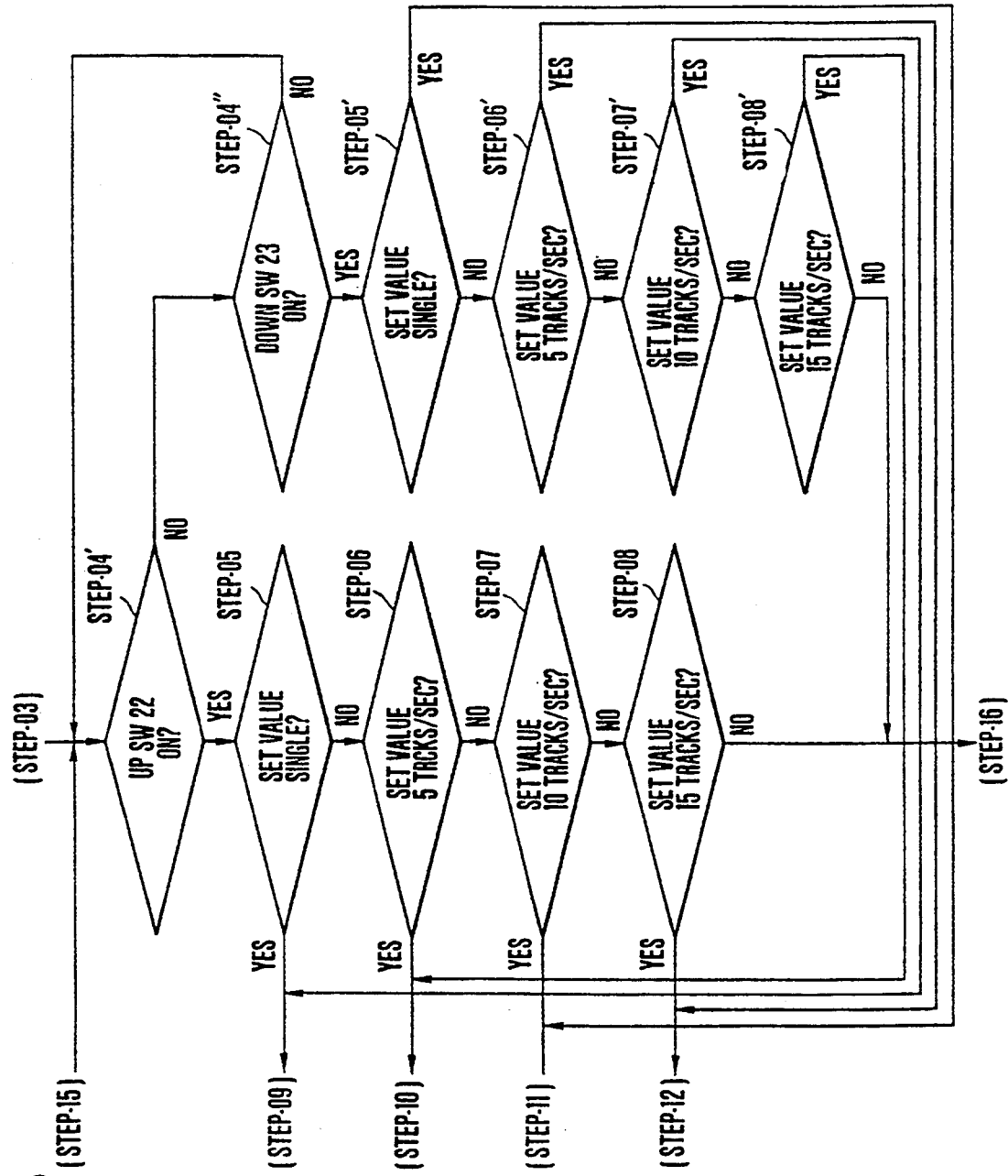
FIG. 6 is a partial flow chart showing the steps of a head shifting speed setting operation of another embodiment of this invention, FIG. 6 including only the parts differing from the flow chart of FIG. 2.

This modification is employed in another embodiment, which operates as shown in the flow chart of FIG. 6. FIG. 6 shows only the parts that differ from the flow chart of FIG. 2 and the rest of the flow of operation is same with FIG. 2.

In this embodiment, with the switch 21 turned on (Step-00 of FIG. 2), when a predetermined period of time (0.7 sec) lapses after that (Step-03 of FIG. 2), the control circuit 13 detects which of the up-shift switch 22 or the down-shift switch 23 is on (Step-04' and Step-04" of FIG. 6). If it is the up-shift switch 22 that is turned on, the operation is performed in the same manner as the Step-05 and the subsequent steps of FIG. 2. In case that the down-shift switch 23 is turned on, the embodiment performs Step-05' and the ensuing steps of operation.

With the up-shift switch 22 turned on, the renewal (Step-09–Step-12) of the head shifting speed setting value according to the results of discrimination made at Step-05–Step-08 is performed in the same manner as in the case of FIG. 2. Whereas, in case where the down-shift switch 23 is turned on instead of the other switch 22, the renewal of the setting value according to the results of discrimation made at Step-05'–Step-08' is performed in the following manner: At Step-05', if the currently set value represents the single step mode and, therefore, the answer is YES, the operation comes to Step-11 to shift the set value to 15 tracks/sec. At Step-06', if the currently set value is 5 tracks/sec, and, therefore, the answer is YES, the operation goes to Step-12 to shift the setting value to the single step. At Step-07', if the currently set value is 10 tracks/sec and, accordingly, the answer is YES, the operation goes to Step-09 to shift the setting value to 5 tracks/sec. At Step-08', if the currently set value is 15 tracks/sec and, accordingly, the answer is YES, the operation goes to Step-10 to shift the setting value to 10 tracks/sec.

Such being the arrangement of the embodiment, with the up-shift switch 22 turned on, the setting value is continuously renewed in the order of:

Single → 5 tracks/sec → 10 tracks/sec → 15 tracks/sec → single → . . .

In case that it is the down-shift switch 23 that is turned on on the other hand, the setting value is renewed in the order of:

15 tracks/sec → 10 tracks/sec → 5 tracks/sec → single → 15 tracks/sec → . . .

In the case of this embodiment, the function block arrangement required for the control circuit 13 is similar to the arrangement shown in FIGS. 5A and 5B except that: The head shifting speed setting value is arranged to be changed only when the switch 22 or 23 is turned on under the condition that the discrimination circuit 131 has received a signal from the input circuit 14 indicating that the switch 21 is on. Further, in that instance, the order in which the head shifting speed setting value is renewed with the switch 22 turned on is reversed in case that the switch 23 is turned on instead of the switch 22.

The above-stated arrangement for changing the head shifting speed may be replaced with different arrangement. For example, the setting value of the head shifting speed may be arranged to be renewable or changeable only when the selection switch 21 is repeatedly turned on within a predetermined length of interval time. Such a modification is employed in a further embodiment of this invention. The Operation of the embodiment is as shown in another flow chart of FIG. 7.

Figure 7:
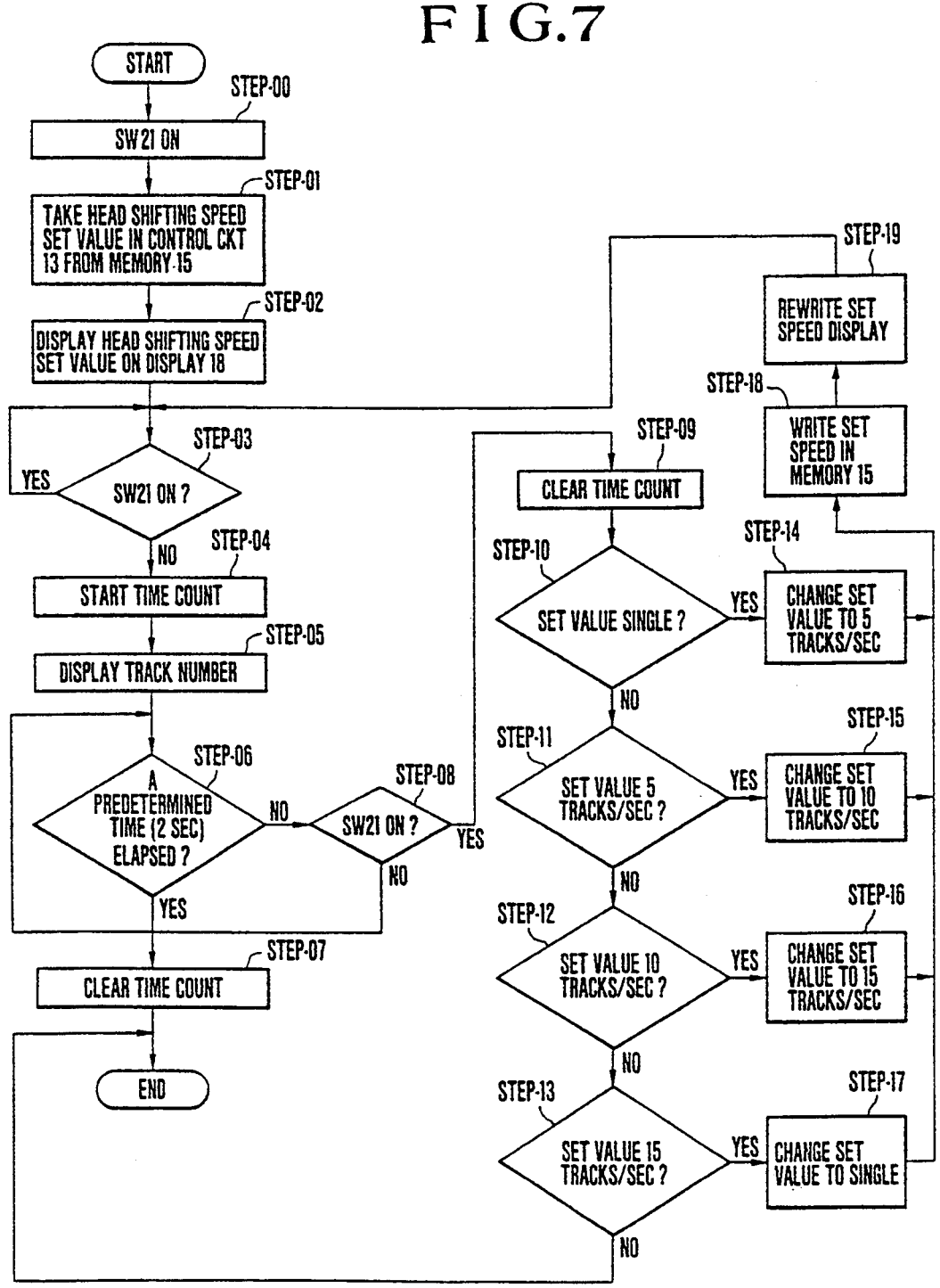
FIG. 7 is a flow chart showing the steps of a head shifting speed setting operation performed by a further embodiment of this invention.

Referring to FIG. 7, the operation of this further embodiment is as follows: First, when the head shifting speed selection switch 21 is turned on (Step-00), the control circuit 13 takes in a data stored then at the memory 15 on the head shifting speed (Step-01). The circuit 13 causes the memory 15 to produce and supply the same data to the decoder/driver 16. Therefore, the display device 18 displays the currently set head shifting speed (Step-02). This displayed speed represents the head shifting speed which has been set before the head shifting speed selection switch 21 is turned on. The control circuit 13 allows the display device 18 to continue to display this head shifting speed as long as the head shifting speed selection switch 21 remains on (Step-03). Then, when the head shifting speed selection switch 21 is turned off, the control circuit 13 begins to count time (Step-04). At the same time, the control circuit 13 controls the data output of the memory 15 to have the display device 18 display a number assigned to a recording track then confronting the head 6 (Step-05). The control circuit 13 then determines whether or not the head shifting speed selection switch 21 is again turned on before the count time reaches a predetermined length of time, say, two seconds (Step-06 and Step-08). If not, the control circuit 13 clears the time count (Step-07). The speed selection comes to an end.

On the other hand, in case that the circuit 13 detects that the switch 21 is again turned on prior to the lapse of the predetermined length of time at Step-08, the time count is cleared (Step-09). If the currently set head shifting speed represents the single step mode, for example, the setting speed is shifted to 5 tracks/sec (Step-10 and Step-14). The newly set speed is written in at the memory 15 (Step-18). The setting speed display is renewed accordingly (Step-19). If the currently set head shifting speed is 5 tracks/sec, it is shifted to 10 tracks/sec. If the currently set speed is 10 tracks/sec, it is shifted to 15 tracks/sec. If the currently set speed is 15 tracks/sec, it is shifted to the single step. The newly set speed is written in at the memory 15 and the set speed display is changed accordingly (Step-11–Step-19). Here, the operation comes back to Step-03. Discrimination is made as to whether the head shifting speed selection switch 21 is on (Step-03). If the switch 21 is on, the display device 18 continues to display the head shifting speed set at that time. If the switch 21 is not on, time count is performed (Step-04). The display device 18 is caused to display the number or address of the track which the head 6 is confronting (Step-05). The above-stated steps of operation are repeated thereafter. In other words, so long as the head shifting speed selection switch 21 remains on, a head shifting speed which is set at that time is displayed at the display device 18. Thereafter, the setting and the display of the head shifting speed are repeatedly changed according as the switch 21 is turned on and off in the order of:

Single → 5 tracks/sec → 10 tracks/sec → 15 tracks/sec single . . .

However, in case that a predetermined period of time (2 sec) or more elapses after the head shifting speed selection switch 21 is turned on, no change takes place any longer in the setting and display of the head shifting speed when the switch 21 is again turned on. The setting value is thus renewable only when the switch 21 is turned on and off at an interval time shorter than the preditermined period of time (2 sec). The term "interval time" as used here means a length of time between turning the switch 21 on and turning it off because the currently set head shifting speed continues to be displayed at the display device 18 while the switch 21 is on.

To facilitate confirmation of the renewal of the head shifting speed setting, the display of the newly set speed at Step-19 is preferably arranged to last over a certain period of time, say, one second before the operation shifts to Step-03. The change-over of the display to a track number display at Step-05 may be changed to be effected after the time count clearance of Step-07.

The arrangement of the function blocks of the control circuit 13 of this embodiment is similar to the arrangement shown in FIGS. 5A and 5B except that the function of the discrimination circuit 131 of FIG. 5A is in this case changed as described below:

In the arrangement of FIG. 5A, when a signal is supplied from the input circuit 14 to the discrimination circuit 131 indicating that the switch 21 is turned on (Step-00 of FIG. 7), the discrimination circuit 131 instructs the memory 15 to produce a data on the currently set head shifting speed and causes the data thus produced from the memory 15 to be stored at the register 133 (Step-01 of FIG. 7). As a result of that, the display device 18 displays the currently set head shifting speed (Step-02 of FIG. 7). Next, when it is detected that the switch 21 is turned off (Step-03 of FIG. 7), the timer circuit 132 is triggered to begin to count a predetermined period of time (2 sec) (Step-04 of FIG. 7). The memory 15 is, at the same time, instructed to produce a data on a track number. The display device 18 then displays the number of the track which the head 6 is confronting at that time (Step-05 of FIG. 7). If the switch 21 is not turned on again before the predetermined period of time has been counted up by the timer circuit 132 (Step-06 and Step-08 of FIG. 7), the discrimination circuit 131 clears the timer circuit 132 after the lapse of the predetermined period of time (Step-07 of FIG. 7). In case that the switch 21 is turned on before the lapse of the predetermined period of time (Step-08 of FIG. 7), the circuit 131 clears the timer circuit 132 (Step-09 of FIG. 7) and instructs the data change circuit 134 to change the head shifting speed setting to a next setting value. The head shifting speed setting is changed accordingly (Step-10–Step-17 of FIG. 7). The discrimination circuit 131 further instructs the memory 15 to take in the output of the data change circuit 134 produced at that time and to produce it (Step-18 of FIG. 7). The display device 18 then displays the newly set head shifting speed (Step-19 of FIG. 7).

As described in the foregoing, the display device 18 is arranged to be capable of displaying a head shifting speed and a track number. However, the display device may be arranged to display the condition of the apparatus such as a setting mode (recording or reproduction) or the like either in addition to or in place of the track number display.

In accordance with this invention, as described in detail in the foregoing, the recording and/or reproducing apparatus of the kind arranged as mentioned in the beginning of this specification to permit selection of a desired head shifting speed from among a plurality of different head shifting speeds can be simplified in the arrangement of the speed selecting and displaying parts. The invention not only thus permits reduction in size and cost of the apparatus but also lessens the fear of having a confusing display of information. The invention is, therefore, extremely advantageous for the recording and/or reproducing apparatuses of the kind described.

What is claimed is:

1. An apparatus for recording signals on and/or reproducing recorded signals from a record bearing medium, comprising:
   (a) a recording and/or reproducing head;
   (b) shifting means for shifting said head relative to the record bearing medium to change the recording or reproducing position of the head on the medium;
   (c) shift control means for controlling said shifting means, said shift control means having a plurality of different control possibilities and controlling the shifting means according to selected one of said possibilities;
   (d) selection means for selecting one of said control possibilities of said shift control means;
   (e) display means for displaying an information; and
   (f) display control means responsive to said selection means for causing said display means to display an information on the selected control possibility of said shift control means at the time of the selection of the possibility by the selection means and causing the display means to display another information in the case other than the selection of said control possibility of the shift control means,
   wherein said another information includes an information on the position of said head on the record bearing medium,
   wherein said shift control means includes manually operable means for causing said shift means to shift said head,
   and said control possibilities include a first possibility for causing said shift means to shift said head by a predetermined amount in response to each operation of said operable means and a second possibility for causing the shift means to successively shift the head with said predetermined amount as long as the operable means is in the operated condition,
   wherein said second possibility includes a plurality of sub-possibilities different from each other in the head shift rates;
   said selection means being arranged to select one of said sub-possibilities of said second possibility.

2. An apparatus for recording signals on and/or reproducing recorded signals from a record bearing medium, comprising:
   (a) a recording and/or reproducing head;
   (b) shifting means for shifting said head relative to the record bearing medium to change the recording or reproducing position of the head on the medium;
   (c) shift control means for controlling said shifting means, said shift control means having a plurality of different control possibilities and controlling the shifting means according to selected one of said possibilities;

(d) selection means for selecting one of said control possibilities Of said shift control means;

(e) display means for displaying an information; and (f) display control means responsive to said selection means for causing said display means to display an information on the selected control possibility of said shift control means at the time of the selection of the possibility by the selection means and causing the display means to display another information in the case other than the selection of said control possibility of the shift control means, wherein said shift control means includes manually operable means for causing said shift means to shift said head;

and said control possibilities include a first possibility for causing said shift means to shift said head by a predetermined amount in response to each operation of said operable means and a second possibility for causing the shift means to successively shift the head with said predetermined amount as long as the Operable means is in the operated condition, wherein said second possibility includes a plurality of sub-possibility different from each other in the head shift rates;

said selection means being arranged to select one of said sub-possibilities of said second possibility.

3. An apparatus for recording signals on and/or reproducing recorded signals from a record bearing medium, comprising:

(a) a recording and/or reproducing head;

(b) shifting means for shifting said head relative to the record bearing medium to change the recording or reproducing position of the head on the medium;

(c) shift control means for controlling said shifting means, said shift control means having a plurality of different control possibilities and controlling the shifting means according to Selected one of said possibilities;

(d) selection means for selecting one of said control possibilities of said shift control means;

(e) display means for displaying an information; and (f) display control means responsive to said selection means for causing said display means to display an information on the selected control possibility of said shift control means at the time of the selection of the possibility by the selection means and causing the display means to display another information in the case other than the selection of said control possibility of the shift control means.

wherein said selection means includes:

manually operable means for selecting the control possibility of said shift control means; and possibility changing means responsive to said operable means to cyclically change the control possibility from one to the other at a predetermined rate as long as the operable means is in the operated condition;

said display control means being arranged to respond to said changing means to cause said display means to display each changed control possibility changed by the changing means.

4. The apparatus according to claim 3, wherein said another information includes an information on the position of said head on the record bearing medium.

5. The apparatus according to claim 4, wherein said shift control means includes manually operable means for causing said shift means to shift said head;

and said control possibilities include a first possibility for causing said shift means to shift said head by a predetermined amount in response to each operation of said operable means and a second possibility for causing the shift means to successively shift the head with said predetermined amount as long as the operable means is in the operated condition.

6. The apparatus according to claim 3 wherein said shift control means includes manually operable means for causing said shift means to shift said head;

and said control possibilities include a first possibility for causing said shift means to shift said head by a predetermined amount in response to each operation of said operable means and a second possibility for causing the shift means to successively shift the head with said predetermined amount as long as the operable means is in the operated condition.

7. An apparatus for recording signals on and/or reproducing recorded signals from a record bearing medium, comprising:

(a) a recording and/or reproducing head;

(b) shifting means for shifting said head relative to the record bearing medium to change the recording or reproducing position of the head on the medium;

(c) shift control means for controlling said shifting means, said shift control means having a plurality of different control possibilities and controlling the shifting means according to selected one of said possibilities;

(d) selection means for selecting one of said control possibilities of said shift control means;

(e) display means for displaying an information; and (f) display control means responsive to said selection means for causing said display means to display an information on the selected control possibility of said shift control means at the time of the selection of the possibility by the selection means and causing the display means to display another information in the case other than the selection of said control possibility of the shift control means, wherein said selection means includes:

manually operable means for selecting the control possibility of said shift control means; and possibility changing means responsive to said operable means to change the control possibility from one to the other at each time when the operable means is operated;

said display control means being arranged to respond to said changing means to cause said display means to display each changed control possibility changed by the changing means.

8. An apparatus for recording signals on and/or reproducing recorded signals from a record bearing medium, comprising:

(a) a recording and/or reproducing head;

(b) shifting means for Shifting said head relative to the record bearing medium to change the recording or reproducing position of the head on the medium;

(c) shift control means for Controlling said shifting means, said shift control means having a plurality of different control possibilities and controlling the shifting means according to selected one of Said possibilities;

(d) selection means for selecting one of said control possibilities of said shift control means;

(e) display means for displaying an information; and (f) display control means responsive to said selection means for causing said display means to display an information on the selected control possibility of said shift control means at the time of the selection of the possibility by the selection means and causing the display means to display another information in the case other than the selection of said control possibility of the shift control means, wherein said selection means includes:

manually operable means for selecting the control possibility of said shift control means; and possibility changing means responsive to repetitive operation of said operable means to change the control possibility from one to the other, said changing means being arranged to change the possibility when the time interval between the two successive operations of the operable means is shorter than a predetermined period of time;

said display control means being arranged to respond to said changing means to cause said display means to display each changed control possibility changed by changing means.

9. The apparatus according to claim 8, wherein said display control means is arranged to cause said display means to display a currently set control possibility when said operable means is operated after the lapse of said predetermined period of time.

10. A recording and/or reproducing apparatus using a rotary type record bearing medium, comprising:

(a) a movable head for recording signals on and/or reproducing recorded signals from the record bearing medium;

(b) drive means for rotating the medium relative to said head;

(c) head shifting means for intermittently shifting said head relative to the record bearing medium to change the recording or reproducing position of the head on the medium;

(d) head shift control means for controlling said shifting means, said shift control means having a plurality of different control modes and controlling the shifting means according to selected one Of said modes;

(e) selection means for selecting one of said control modes of said shift control means;

(f) display means for displaying an information; and (g) display control means responsive to said selection means for causing said display means to display an information on the selected control mode of said shift control means at the time of the selection of the mode by the selection means and causing the display means to display another information in the case other than the selection of said control mode of the shift control means, wherein said another information includes an information on the position of said head on the record bearing medium, wherein said shift control means includes manually operable means for causing said shift means to shift said head;

and said control modes include a first mode for causing said shift means to shift said head by a predetermined amount in response to each operation of said operable means and a second mode for causing the shift means to successively shift the head with said predetermined amount as long as the operable means is in the operated condition, wherein said second mode includes a plurality of sub-modes different from each other in head shift rates;

said selection means being arranged to select one of said sub-modes of said second possibility.

11. A recording and/or reproducing apparatus using a rotary type record bearing medium, comprising:

(a) a movable head for recording signals on and/or reproducing recorded signals from the record bearing medium;

(b) drive means for rotating the medium relative to said head;

(c) head shifting means for intermittently shifting said head relative to the record bearing medium to change the recording or reproducing position of the head on the medium;

(d) head shift control means for controlling said shifting means, said shift control means having a plurality of different control modes and controlling the shifting means according to selected one of said modes;

(e) selection means for selecting one of said control modes of said shift control means;

(f) display means for displaying an information; and (g) display control means responsive to said selection means for causing said display means to display an information on the selected control mode of said shift control means at the time of the selection of the mode by the selection means and causing the display means to display another information in the case other than the selection of said control mode of the shift control means, wherein said shift control means includes manually operable means for causing said shift means to shift said head;

and said control modes include a first mode for causing said shift means to shift said head by a predetermined amount in response to each operation of said operable means and a second mode for causing the shift means to successively shift the head with said predetermined amount as long as the operable means is in the operated condition, wherein said second mode includes a plurality of sub-modes different from each other in the head shift rates;

said selection means being arranged to select one of said sub-modes of said second possibility.

12. A recording and/or reproducing apparatus using a rotary type record bearing medium, comprising:

(a) a movable head for recording signals on and/or reproducing recorded signals from the record bearing medium;

(b) drive means for rotating the medium relative to said head;

(c) head shifting means for intermittently shifting said head relative to the record bearing medium to change the recording or reproducing position of the head on the medium;

(d) head shift control means for controlling said shifting means, said shift control means having a plurality of different control modes and controlling the shifting means according to selected one of said modes;

(e) selection means for selecting one of said control modes of said shift control means;

(f) display means for displaying an information; and (g) display control means responsive to said selection means for causing said display means to display an information on the selected control mode of said shift control means at the time of the selection of the mode by the selection means and causing the display means to display another information in the case other than the selection of said control mode of the shift control means, wherein said selection means includes:

manually operable means for selecting the control mode of said shift control means; and mode changing means responsive to said operable means to cyclically change the control mode from one to the other at a predetermined rate as long as the operable means is in the operated condition;

said display control means being arranged to respond to said changing means to cause said display means to display each changed control mode changed by the changing means.

13. The apparatus according to claim 12, wherein said another information includes an information on the position of said head on the record bearing medium.

14. The apparatus according to claim 13, wherein said shift control means includes manually operable means for causing said shift means to shift said head;

and said control modes include a first mode for causing said shift means to shift said head by a predetermined amount in response to each operation of said operable means and a second mode for causing the shift means to successively shift the head with said predetermined amount as long as the operable means is in the operated condition.

15. The apparatus according to claim 13, wherein said shift control means includes manually operable means for causing said shift means to shift said head;

and said control modes include a first mode for causing said shift means to shift said head by a predetermined amount in response to each operation of said operable means and a second mode for causing the shift means to successively shift the head with said predetermined amount as long as the operable means is in the operated condition.

16. A recording and/or reproducing apparatus using a rotary type record bearing medium, comprising:

(a) a movable head for recording signals on and/or reproducing recorded signals from the record bearing medium;

(b) drive means for rotating the medium relative to said head;

(c) head shifting means for intermittently shifting said head relative to the record bearing medium to change the recording or reproducing position of the head on the medium;

(d) head shift control means for controlling said shifting means, said shift control means having a plurality of different control modes and controlling the shifting means according to selected one of said modes;

(e) selection means for selecting one of said control modes of said shift control means;

(f) display means for displaying an information; and (g) display control means responsive to said selection means for causing said display means to display an information on the selected control mode of said shift control means at the time of the selection of the mode by the selection means and causing the display means to display another information in the case other than the selection of said control mode of the shift control means, wherein said selection means includes:

manually operable means for selecting the control mode of said shift control means; and mode changing means responsive to said operable means to change the control mode from one to the other at each time when the operable means is operated;

said display control means being arranged to respond to said changing means to cause said display means to display each changed control mode changed by the changing means.

17. A recording and/or reproducing apparatus using a rotary type record bearing medium, comprising:

(a) a movable head for recording signals on and/or reproducing recorded signals from the record bearing medium;

(b) drive means for rotating the medium relative to said head;

(c) head shifting means for intermittently shifting said head relative to the record bearing medium to change the recording or reproducing position of the head on the medium;

(d) head shift control means for controlling said shifting means, said Shift control means having a plurality of different control modes and controlling the shifting means according to selected one of said modes;

(e) selection means for selecting one of said control modes of said shift control means;

(f) display means for displaying an information; and (g) display control means responsive to said selection means for causing said display means to display an information on the selected control mode of said shift control means at the time of the selection of the mode by the selection means and causing the display means to display another information in the case other than the selection of said control mode of the shift control means, wherein said selection means includes:

manually operable means for selecting the control mode of said shift control means; and mode changing means responsive to repetitive operation of said operable means to change the control from one to the other, said changing means being arranged to change the mode when the time interval between the two successive operations of the operable means is shorter than a predetermined period of time;

said display control means being arranged to respond to said changing means to cause said display means to display each changed control mode changed by the changing means.

18. The apparatus according to claim 17, wherein said display control means is arranged to cause said display means to display a currently set control mode when said operable means is operated after the lapse of said predetermined period of time.

19. A magnetic recording and/or reproducing apparatus using a magnetic disc, comprising:

(a) a movable magnetic head for recording signals on and/or reproducing recorded signals from the disc, (b) a motor for rotating the disc relative to said head;

(c) head shifting means for intermittently shifting said head relative to the disc to change the recording or reproducing position of the head on the disc;

(d) head shift control means for controlling said shifting means, said shift control means being arranged to control a head shift rate of the shifting means according to selected one of a plurality of different head shift rates;

(e) selection means for selecting one of said head shift rates for said shift control means;

(f) display means for displaying an information; and (g) display control means responsive to said selection means for causing said display means to display an information on the selected head shift rate selected for said shift control means at the time of the selection of the head shift rate by the selection means and causing the display means to display another information in the case other than the selection of said head shift rate for the shift Control means, wherein said another information includes an information on the position of said head on the disc, wherein said shift control means includes manually operable means for causing said shift means to shift said head, and said head shift rates include a first rate for causing said shift means to shift said head by a predetermined amount in response to each operation of said operable means and a second rate for causing the shift means to successively shift the head with said predetermined amount as long as the operable means is in the operated condition, wherein said second rate includes a plurality of sub-rates different from each other in the head shift rates;

said selection means being arranged to select one of said sub-rates of said second rate.

20. A magnetic recording and/or reproducing apparatus using a magnetic disc, comprising:

(a) a movable magnetic head for recording Signals on and/or reproducing recorded signals from the disc;

(b) a motor for rotating the disc relative to said head;

(c) head shifting means for intermittently shifting said head relative to the disc to change the recording or reproducing position of the head on the disc;

(d) head shift control means for controlling said shifting means, said shift control means being arranged to control a head shift rate of the shifting means according to selected one of a plurality of different head shift rates;

(e) selection means for selecting one of said head shift rates for said shift control means;

(f) display means for displaying an information; and (g) display control means responsive to said selection means for causing said display means to display an information on the selected head shift rate selected for said shift control means at the time of the selection of the head shift rate by the selection means and causing the display means to display another information in the case other than the selection of said head shift rate for the shift control means, wherein said shift control means includes manually operable means for causing Said shift means to shift said head;

and said head shift rates include a first rate for causing said shift means to shift said head by a predetermined amount in response to each operation of said operable means and a second rate for causing the shift means to successively Shift the head with said predetermined amount as long as the operable means is in the operated condition, wherein said second rate includes a plurality of sub-rates different from each other in the head shift rates;

said selection means being arranged to select one of said sub-rates of said second rate.

21. The apparatus according to claim 20, wherein said another information includes an information on the position of said head on the disc.

22. The apparatus according to claim 21, wherein said shift control means includes manually operable means for causing said shift means to shift said head;

and said head shift rates include a first rate for causing said shift means to shift said head by a predetermined amount in response to each operation of said operable means and a second rate for causing the shift means to successively shift the head with said predetermined amount as long as the operable means is in the operated condition.

23. The apparatus according to claim 20, wherein said selection means includes;

manually operable means for selecting the head shift rate for said shift control means; and changing means responsive to said operable means to cyclically change the head shift rate from one to the other at a predetermined rate as long as the operable means is in the operated condition;

said display control means being arranged to respond to said changing means to cause said display means to display each changed head shift rate changed by the changing means.

24. The apparatus according to claim 20, wherein said selection means includes;

manually operable means for selecting the head shift rate for said shift control means; and changing means responsive to said operable means to change the head shift rate from one to the other at each time when the operable means is operated;

said display control means being arranged to respond to said changing means to cause said display means to display each changed head shift rate changed by the changing means.

25. The apparatus according to claim 20, wherein said selection means includes;

manually operable means for selecting the head shift rate for said shift control means; and changing means responsive to repetitive operation of said operable means to change the head shift rate from one to the other, said changing means being arranged to change the head shift rate when the time interval between the two successive operations of the operable means is shorter than a predetermined period of time;

said display control means being arranged to respond to said changing means to cause said display means to display each changed head shift rate changed by the changing means.

26. The apparatus according to claim 25, wherein said display control means is arranged to cause said display means is to display a currently set head shift rate when said operable means is operated after the lapse of said predetermined period of time.

* * * * *